United States Patent
Salois et al.

(10) Patent No.: US 10,253,892 B2
(45) Date of Patent: Apr. 9, 2019

(54) ENERGETIC ONE WAY SEQUENCE TERMINATION VALVE

(71) Applicant: Goodrich Corporation, Charlotte, NC (US)

(72) Inventors: Matthew Salois, Berwick, ME (US); Matthew Campbell, Dixon, CA (US)

(73) Assignee: Goodrich Corporation, Charlotte, NC (US)

( * ) Notice: Subject to any disclaimer, the term of this patent is extended or adjusted under 35 U.S.C. 154(b) by 123 days.

(21) Appl. No.: 15/428,777

(22) Filed: Feb. 9, 2017

(65) Prior Publication Data

US 2018/0224007 A1    Aug. 9, 2018

(51) Int. Cl.

| F16K 11/065 | (2006.01) |
|---|---|
| F16K 11/22 | (2006.01) |
| B64D 25/00 | (2006.01) |
| F16K 31/122 | (2006.01) |
| F15B 13/02 | (2006.01) |
| F15B 13/04 | (2006.01) |
| F16K 17/00 | (2006.01) |
| F16K 17/34 | (2006.01) |

(52) U.S. Cl.
CPC ............... F16K 11/22 (2013.01); B64D 25/00 (2013.01); F15B 13/028 (2013.01); F15B 13/0402 (2013.01); F16K 11/0655 (2013.01); F16K 17/00 (2013.01); F16K 17/003 (2013.01); F16K 17/34 (2013.01); F16K 31/122 (2013.01); F16K 31/1223 (2013.01); F15B 2211/3052 (2013.01)

(58) Field of Classification Search
CPC ................ F16K 11/22; F16K 11/0655

USPC .............. 137/625.4, 625.48, 68.13
See application file for complete search history.

(56) References Cited

U.S. PATENT DOCUMENTS

| 3,548,848 A | 12/1970 | Stichling |
| 3,583,157 A | 6/1971 | Adams et al. |
| 3,805,836 A * | 4/1974 | Veale ............... F16K 11/07 137/334 |
| 3,951,166 A * | 4/1976 | Whitener ........... F16K 11/0712 137/625.27 |
| 3,968,729 A * | 7/1976 | Hansen ............. F15C 3/02 91/32 |

(Continued)

FOREIGN PATENT DOCUMENTS

| WO | 9734785 | 9/1997 |
| WO | 2015086107 | 6/2015 |

OTHER PUBLICATIONS

European Patent Office, European Search Report dated Apr. 24, 2018 in Application No. 18155869.3-1010.

Primary Examiner — Reginald S Tillman, Jr.
(74) Attorney, Agent, or Firm — Snell & Wilmer, L.L.P.

(57) ABSTRACT

An energetic one way sequence termination arrangement may comprise a housing, a first inlet in operable communication with the housing, a second inlet in operable communication with the housing, and an outlet in operable communication with the housing. The energetic one way sequence termination arrangement is configured such that the second inlet is blocked from fluidic communication with the outlet in response to a first signal being received at the first inlet before a second signal is received at the second inlet, and the first inlet establishes fluidic communication with the outlet in response to the second signal being received at the second inlet before the first signal is received at the first inlet.

17 Claims, 4 Drawing Sheets

(56) References Cited

U.S. PATENT DOCUMENTS

| | | | | |
|---|---|---|---|---|
| 4,078,579 | A | * | 3/1978 | Bucko, Sr. .......... F16K 11/0655 |
| | | | | 137/625.48 |
| 4,432,215 | A | | 2/1984 | Yoshida |
| 4,448,211 | A | | 5/1984 | Yoshida |
| 4,683,914 | A | * | 8/1987 | Brisland ................ F01L 15/08 |
| | | | | 137/625.25 |
| 4,852,612 | A | * | 8/1989 | Bucko, Sr. ............ F16K 11/044 |
| | | | | 137/625.5 |
| 4,877,058 | A | * | 10/1989 | Stoll ................... F16K 11/0655 |
| | | | | 137/625.48 |
| 5,189,991 | A | * | 3/1993 | Humburg ............ F16K 31/0675 |
| | | | | 123/41.1 |
| 5,247,966 | A | * | 9/1993 | Stevens ............... A61M 1/0064 |
| | | | | 137/625.48 |
| 7,036,521 | B2 | * | 5/2006 | Hager ................ F16K 11/0655 |
| | | | | 137/309 |
| 8,347,917 | B2 | * | 1/2013 | Yoshimura .......... F16K 11/0655 |
| | | | | 137/625.43 |
| 2016/0179151 | A1 | | 6/2016 | Ibrahim et al. |

\* cited by examiner

ENERGETIC ONE WAY SEQUENCE TERMINATION VALVE

FIELD

The present disclosure relates generally to energetic input/output logic devices, and more particularly, to energetic sequence valves.

BACKGROUND

Energetic systems may be used for various applications which use explosive energy to achieve a desired result. For example, an energetic system may be used for aircraft seat ejection systems. In various applications, such as seat ejection for example, an inter-sequencing system may determine an order in which various energetics detonate. In this regard, it may be desirable to ensure that a first event occurs before or after a second event.

SUMMARY

An energetic one way sequence termination arrangement is disclosed herein, in accordance with various embodiments. An energetic one way sequence termination arrangement may comprise a housing, a first inlet in operable communication with the housing, a second inlet in operable communication with the housing, and an outlet in operable communication with the housing, the energetic one way sequence termination arrangement being configured such that the second inlet is blocked from fluidic communication with the outlet in response to a first signal being received at the first inlet before a second signal is received at the second inlet, and the first inlet establishes fluidic communication with the outlet in response to the second signal being received at the second inlet before the first signal is received at the first inlet.

In various embodiments, the energetic one way sequence termination arrangement may further comprise a cavity disposed within the housing, and a moveable shuttle disposed within the cavity, wherein the moveable shuttle is moveable between a neutral position, a transferring position, and a terminating position, wherein the moveable shuttle moves to the terminating position in response to the first signal received from the first inlet before the second signal is received from the second inlet, and the moveable shuttle moves to the transferring position in response to the second signal being received from the second inlet before the first signal is received from the first inlet. The first inlet may be in fluid communication with the outlet in response to the moveable shuttle moving to the transferring position. The moveable shuttle may prevent fluid communication between the outlet and at least one of the first inlet and the second inlet in response to the moveable shuttle moving to the terminating position. The moveable shuttle may comprise a recess defining a connecting channel. The first inlet may be in fluid communication with the outlet via the connecting channel in response to the moveable shuttle being in the transferring position. At least one of the first signal and the second signal may comprise a pressure capable of moving the moveable shuttle. At least one of the first signal and the second signal may comprise a pyrotechnic transmission signal. The energetic one way sequence termination arrangement may be made from metal.

A pyrotechnic transfer arrangement is disclosed herein, in accordance with various embodiments. A pyrotechnic transfer arrangement may comprise an energetic one way sequence termination arrangement. The energetic one way sequence termination arrangement may comprise a housing, a first inlet in operable communication with the housing, a second inlet in operable communication with the housing, and an outlet in operable communication with the housing, the energetic one way sequence termination arrangement being configured such that the second inlet is blocked from fluidic communication with the outlet in response to a first signal being received at the first inlet before a second signal is received at the second inlet, and the first inlet establishes fluidic communication with the outlet in response to the second signal being received at the second inlet before the first signal is received at the first inlet. The pyrotechnic transfer arrangement may further comprise a first energetic coupled to the first inlet, a second energetic coupled to the second inlet, and a third energetic coupled to the outlet.

In various embodiments, the pyrotechnic transfer arrangement may further comprise a cavity disposed within the housing, and a moveable shuttle disposed within the cavity, wherein the moveable shuttle is moveable between a neutral position, a transferring position, and a terminating position, wherein the moveable shuttle moves to the terminating position in response to the first signal received from the first inlet before the second signal is received from the second inlet, and the moveable shuttle moves to the transferring position in response to the second signal being received from the second inlet before the first signal is received from the first inlet. The first inlet may be in fluid communication with the outlet in response to the moveable shuttle moving to the transferring position. The moveable shuttle may prevent fluid communication between the outlet and at least one of the first inlet and the second inlet in response to the moveable shuttle moving to the terminating position. The first inlet may be in fluid communication with the outlet in response to the moveable shuttle being in the transferring position. At least one of the first signal and the second signal may comprise a pressure capable of moving the moveable shuttle. At least one of the first signal and the second signal may comprise a pyrotechnic transmission signal. The first signal may be generated by the first energetic and the third energetic may be configured to ignite in response to the first signal being received by the third energetic. The second signal may be generated by the second energetic and the moveable shuttle may be configured to prevent the third energetic from igniting in response to the second signal being received before the first signal. At least one of the first energetic, the second energetic, and the third energetic may comprises a pyrotechnic transmission line.

A method of sequencing a pyrotechnic system is disclosed herein. A method of sequencing a pyrotechnic system may comprise igniting at least one of a first energetic coupled to a first inlet of a one way sequence termination arrangement and a second energetic coupled to a second inlet of the one way sequence termination arrangement, fluidically coupling the first inlet to an outlet of the one way sequence termination arrangement in response to the second energetic being ignited before the first energetic is ignited, and blocking fluidic coupling between the second inlet and the outlet in response to the first energetic being ignited before the second energetic is ignited.

In various embodiments, the method may further comprise moving, by a moveable shuttle, from a neutral position to at least one of a transferring position and a terminating position, coupling the first inlet in fluid communication with the outlet of the one way sequence termination arrangement in response to the moveable shuttle moving to the transferring position, and igniting a third energetic coupled to the outlet in response to the first energetic being ignited, wherein the moveable shuttle moves to the transferring position in response to the second energetic igniting before the first energetic. The method may further comprise preventing the outlet of the one way sequence termination arrangement from fluid communication with at least one of the first inlet and the second inlet in response to the moveable shuttle moving to the terminating position, wherein the moveable shuttle moves to the terminating position in response to the first energetic igniting before the second energetic.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As disclosed herein, a sequence termination arrangement (also referred to herein as a valve) may comprise an input/output device that either stops or passes on an energetic signal based upon a sequence of energetic events. In various embodiments, a first pyrotechnic signal may be transmitted from a first inlet to an outlet in response to a second pyrotechnic signal being received by a second inlet before the first pyrotechnic signal is received. In this regard, sequence termination valves, as disclosed herein provide sequencing termination capabilities. Sequence termination valves, as disclosed herein, may reduce part count in energetic systems. Sequence termination valves, as disclosed herein, may increase reliability of an energetic system. Sequence valves, as disclosed herein, may reduce the number of energetics in a system.

Figure 1:
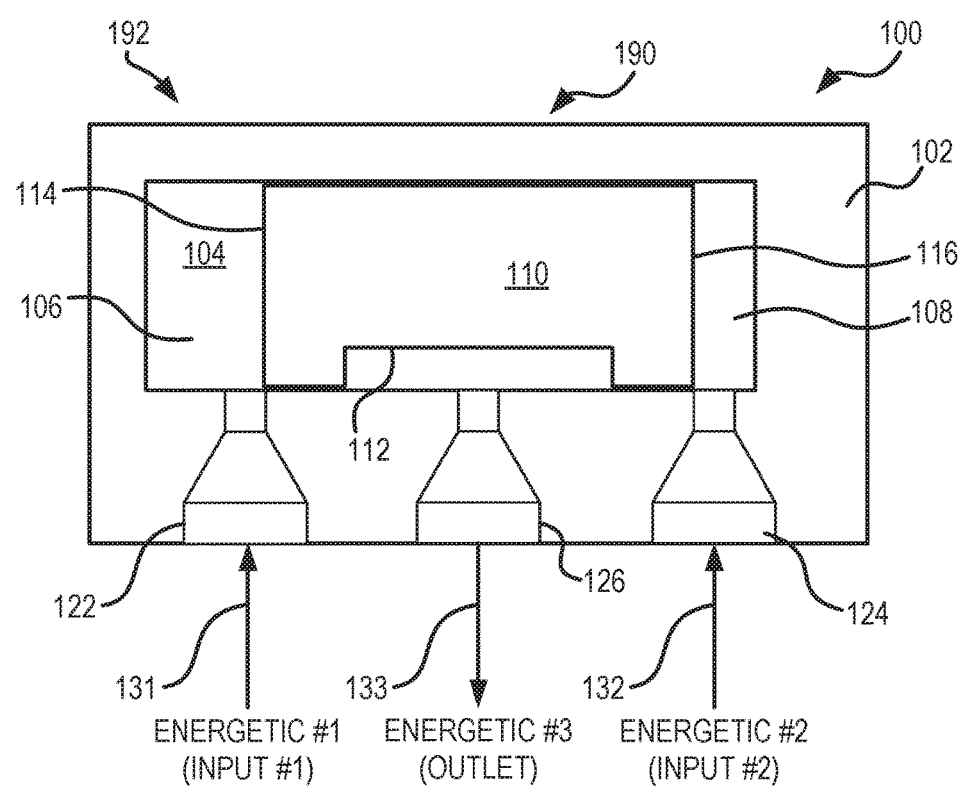
FIG. 1 illustrates a block diagram of an energetic one way sequence termination arrangement with a shuttle in a neutral position, in accordance with various embodiments.

Referring to FIG. 1, a block diagram of a pyrotechnic transfer arrangement 192 is illustrated. Pyrotechnic transfer arrangement 192 may include an energetic one way sequence termination arrangement 100 (also referred to herein as an energetic one way sequence termination valve (STV)), a first energetic 131, a second energetic 132, and a third energetic 133. STV 100 may comprise a housing 102 defining a cavity 104. A moveable shuttle 110 may be disposed within housing 102. In various embodiments, moveable shuttle 110 may comprise a recess 112. Housing 102 and/or moveable shuttle 110 may be metallic. STV 100 may comprise a first inlet 122, a second inlet 124, and an outlet 126. First inlet 122, second inlet 124, and outlet 126 may be in operable communication with the housing 102. First inlet 122, second inlet 124, and outlet 126 may be in fluid communication with cavity 104. FIG. 1 depicts moveable shuttle 110 in a neutral position 190 with first inlet 122 in fluid communication with a first end 114 of moveable shuttle 110 and second inlet 124 in fluid communication with a second end 116 of moveable shuttle 110. In this regard, in the neutral position 190, moveable shuttle 110 may define a first chamber 106 of cavity 104 and a second chamber 108 of cavity 104.

STV 100 may be coupled to the three energetics (i.e., first energetic 131, second energetic 132, and third energetic 133), via first inlet 122, second inlet 124, and outlet 126, respectively. The first energetic 131, second energetic 132, and third energetic 133 may comprise pyrotechnic transmission lines.

A pyrotechnic transmission line may include a reactive material. The pyrotechnic transmission lines may be made, for example, of a material called "TLX" (trademark, Explosive Technology, Inc. of Fairfield, Calif.). However, it is contemplated herein that the energetics may comprise any suitable pyrotechnic transmission line.

When the pyrotechnic transmission line ignites, the reactive material burns. The flame may propagate along the transmission line. In the case of first energetic 131 and second energetic 132, when the first energetic 131 and/or second energetic 132 ignite, the flame may propagate along the transmission line towards STV 100. A pressurized fluid or gas may be propagated into an inlet (e.g., first inlet 122 and/or second inlet 124) which may build pressure within cavity 104. When the pressurized fluid or gas is propagated into STV 100, the STV 100 actuates. Thus, STV 100 actuates in response to ignition of the pyrotechnic transmission lines (i.e., first energetic 131 and/or second energetic 132).

Figure 2A:
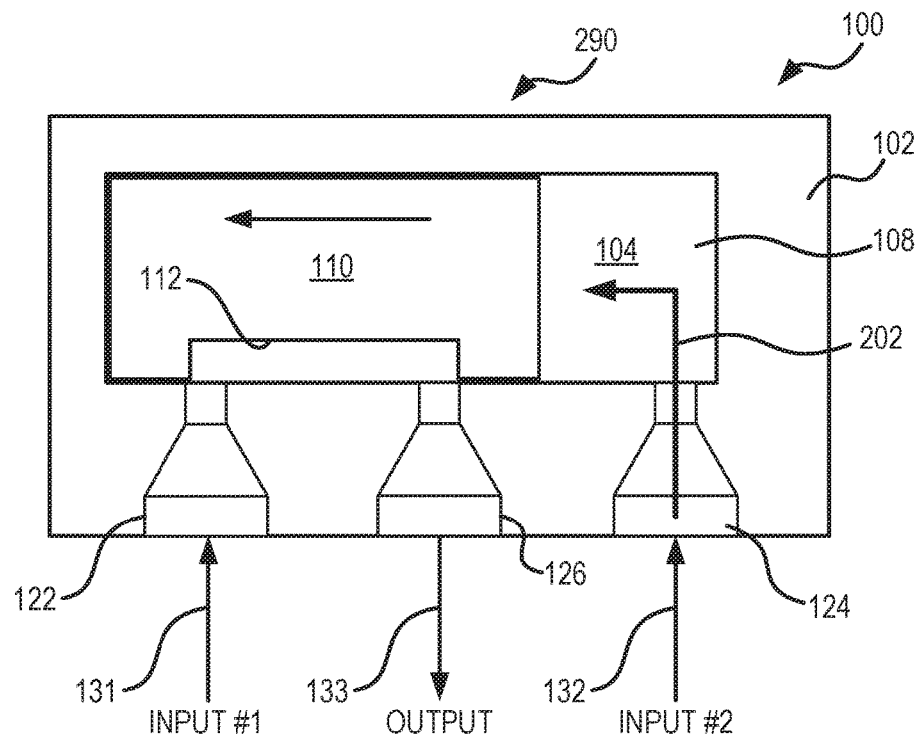
FIGS. 2A and 2B illustrate a block diagram of the energetic one way sequence termination arrangement with the shuttle in a transferring position, in accordance with various embodiments.
Figure 2B:
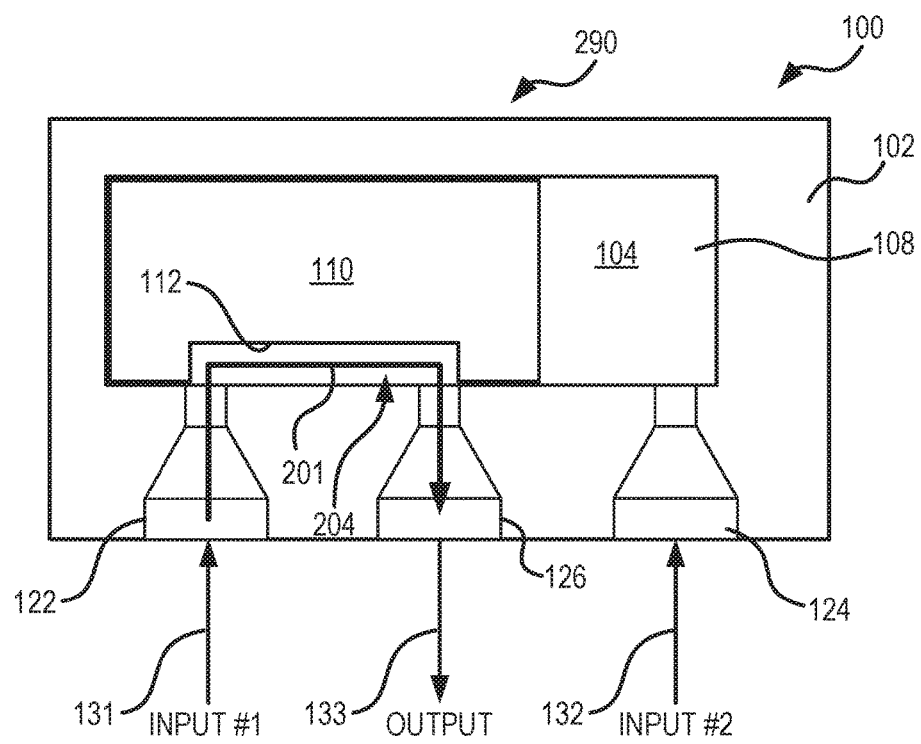

FIGS. 2A and 2B depict exemplary embodiments of a sequencing event of STV 100 in response to second energetic 132 igniting before first energetic 131, as explained below.

With reference to FIG. 2A, moveable shuttle 110 is illustrated in the transferring position 290. A second signal 202 may be received into cavity 104 in response to second energetic 132 being ignited before first energetic 131. The second signal 202 may move or translate moveable shuttle 110 relative to housing 102. In response thereto, second chamber 108 may increase in volume and first chamber 106 (see FIG. 1) may decrease in volume.

With reference to FIG. 2B, in response to moveable shuttle 110 moving to the transferring position 290, first inlet 122 may be in fluid communication with outlet 126. Stated differently, first inlet 122 may establish fluidic communication with outlet 126 in response to the second signal 202 being received at the second inlet 124 before the first signal 201 is received at the first inlet 122. In this regard, recess 112 may define a connecting channel 204 through which first signal 201 may travel. First signal 201 may comprise a temperature and a pressure. Third energetic 133 may ignite in response to third energetic 133 receiving first signal 201.

In various embodiments, the output energy from first energetic 131 may comprise heat, expanding gases, a shock wave, and/or any other energy capable of actuating and/or igniting third energetic 133.

Figure 3A:
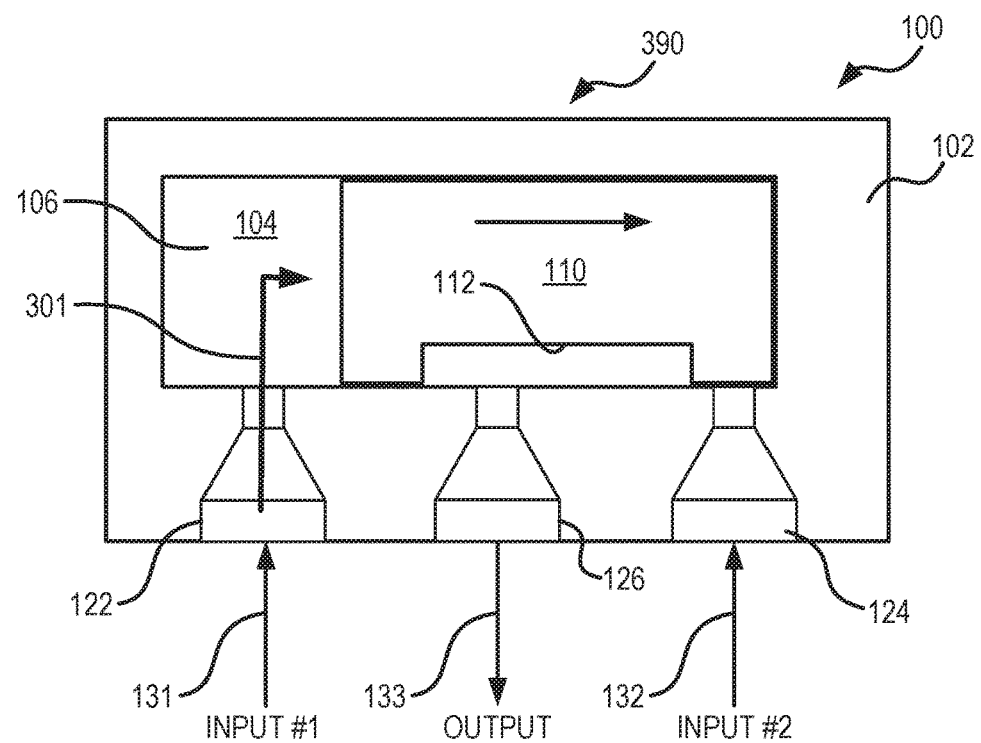
FIGS. 3A and 3B illustrate a block diagram of the energetic one way sequence termination arrangement with the shuttle in a terminating position, in accordance with various embodiments.
Figure 3B:
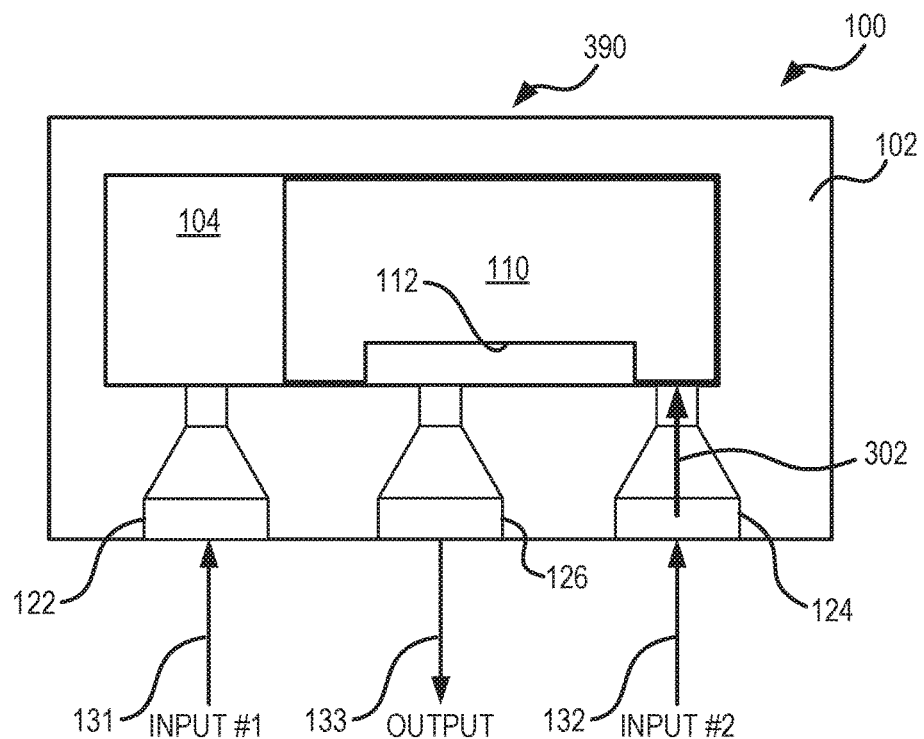

FIGS. 3A and 3B depict exemplary embodiments of a sequencing event of STV 100 in response to second energetic 132 igniting after first energetic 131, as explained below.

With reference to FIG. 3A, moveable shuttle 110 is illustrated in the terminating position 390. A first signal 301 may be received into cavity 104 in response to first energetic 131 being ignited before second energetic 132. The first signal 301 may move or translate moveable shuttle 110 relative to housing 102. In response thereto, first chamber 106 may increase in volume and second chamber 108 (see FIG. 1) may decrease in volume.

With reference to FIG. 3B, in response to moveable shuttle 110 moving to the terminating position 390, first inlet 122 may be prevented from fluid communication with outlet 126. Furthermore, in response to moveable shuttle 110 moving to the terminating position 390, second inlet 124 may be prevented from fluid communication with outlet 126. In this regard, third energetic 133 may be prevented from igniting in response to first energetic 131 igniting before second energetic 132.

Figure 4:
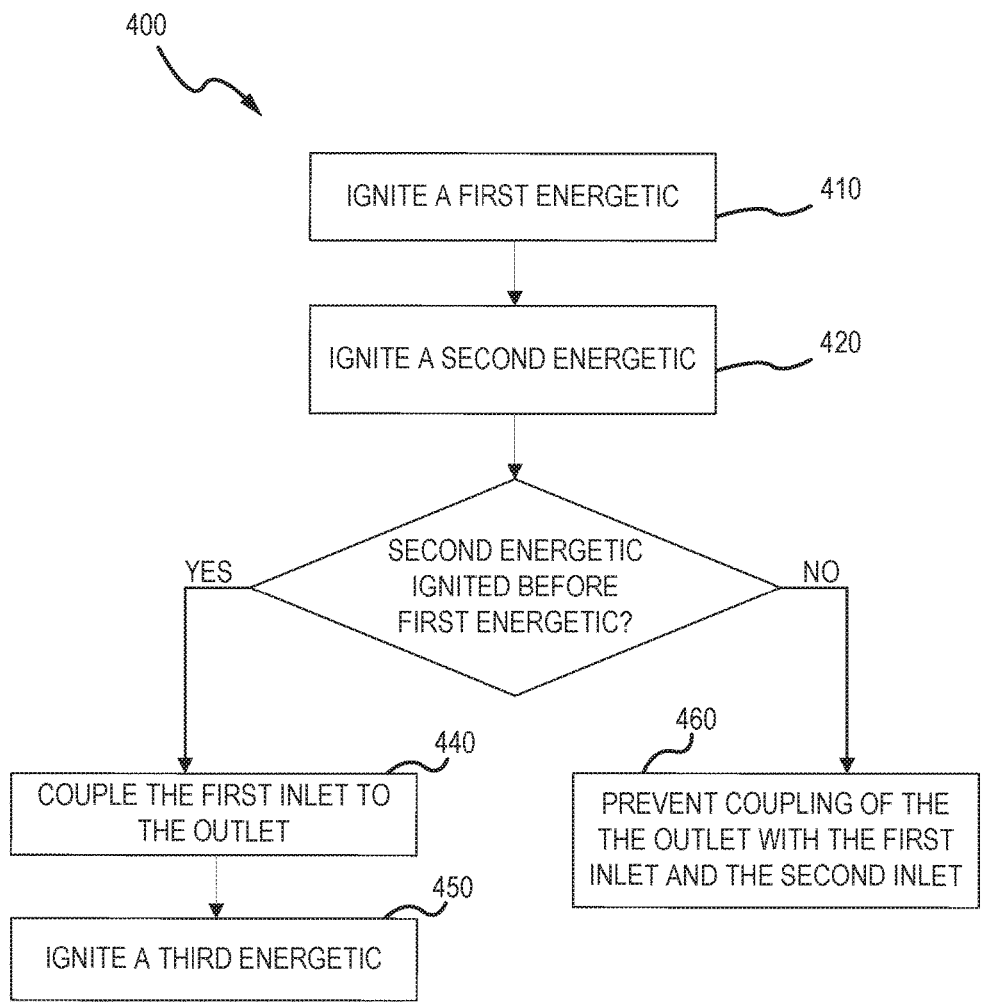
FIG. 4 illustrates a method of sequencing a pyrotechnic system, in accordance with various embodiments.

With reference to FIG. 4, a method 400 for sequencing a pyrotechnic system is depicted, in accordance with various embodiments. Method 400 includes igniting a first energetic (step 410). Method 400 includes igniting a second energetic (step 420). Method 400 may include coupling a first inlet to an outlet (step 440). Method 400 may include igniting a third energetic (step 450). Method 400 may include preventing coupling of the first inlet to the outlet (step 460).

With reference to FIG. 1, FIG. 2A, FIG. 3A, and FIG. 4, step 410 may include igniting first energetic 131. Step 420 may include igniting second energetic 132. First energetic 131 and second energetic 132 may be ignited via any suitable means. In various embodiments, method 400 may include only step 410, only step 420, or both step 410 and step 420. Step 440 may include coupling the first inlet 122 in fluid communication with outlet 126 in response to the moveable shuttle 110 moving to the transferring position 290. Stated differently, step 440 may include coupling the first inlet 122 in fluid communication with outlet 126 in response to second energetic 132 igniting before first energetic 131. Step 450 may include igniting third energetic 133. Third energetic 133 may be ignited via first signal 201. Step 460 may include preventing first inlet 122 from fluid communication with outlet 126 in response to the moveable shuttle 110 moving to the terminating position 390. Stated differently, step 460 may include preventing outlet 126 from fluid communication with first inlet 122 and second inlet 124, in response to first energetic 131 igniting before second energetic 132. In various embodiments, the fluidic coupling or blocking thereof of step 440 and step 460 may include moving moveable shuttle 110. Moveable shuttle 110 may be moved from neutral position 190 to either transferring position 290 or terminating position 390.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An energetic one way sequence termination arrangement, comprising:
    a housing;

a first inlet in operable communication with the housing;
a second inlet in operable communication with the housing; and
an outlet in operable communication with the housing,
the energetic one way sequence termination arrangement being configured such that the second inlet is blocked from fluidic communication with the outlet in response to a first signal being received at the first inlet before a second signal is received at the second inlet, and
the first inlet establishes fluidic communication with the outlet in response to the second signal being received at the second inlet before the first signal is received at the first inlet.

2. The energetic one way sequence termination arrangement of claim 1, further comprising:
a cavity disposed within the housing; and
a moveable shuttle disposed within the cavity,
wherein the moveable shuttle is moveable between a neutral position, a transferring position, and a terminating position;
wherein the moveable shuttle moves to the terminating position in response to the first signal received from the first inlet before the second signal is received from the second inlet, and
the moveable shuttle moves to the transferring position in response to the second signal being received from the second inlet before the first signal is received from the first inlet.

3. The energetic one way sequence termination arrangement of claim 2, wherein the first inlet is in fluid communication with the outlet in response to the moveable shuttle moving to the transferring position.

4. The energetic one way sequence termination arrangement of claim 3, wherein the moveable shuttle prevents fluid communication between the outlet and at least one of the first inlet and the second inlet in response to the moveable shuttle moving to the terminating position.

5. The energetic one way sequence termination arrangement of claim 4, wherein the moveable shuttle comprises a recess defining a connecting channel,
wherein the first inlet is in fluid communication with the outlet via the connecting channel in response to the moveable shuttle being in the transferring position.

6. The energetic one way sequence termination arrangement of claim 5, wherein at least one of the first signal and the second signal comprises a pressure capable of moving the moveable shuttle.

7. The energetic one way sequence termination arrangement of claim 1, wherein at least one of the first signal and the second signal comprises a pyrotechnic transmission signal.

8. The energetic one way sequence termination arrangement of claim 1, wherein the energetic one way sequence termination arrangement is made from metal.

9. A pyrotechnic transfer arrangement, comprising:
an energetic one way sequence termination arrangement, comprising:
a housing;
a first inlet in operable communication with the housing;
a second inlet in operable communication with the housing; and
an outlet in operable communication with the housing,
the energetic one way sequence termination arrangement being configured such that the second inlet is blocked from fluidic communication with the outlet in response to a first signal being received at the first inlet before a second signal is received at the second inlet, and
the first inlet establishes fluidic communication with the outlet in response to the second signal being received at the second inlet before the first signal is received at the first inlet,
a first energetic coupled to the first inlet;
a second energetic coupled to the second inlet; and
a third energetic coupled to the outlet.

10. The pyrotechnic transfer arrangement of claim 9, further comprising:
a cavity disposed within the housing; and
a moveable shuttle disposed within the cavity,
wherein the moveable shuttle is moveable between a neutral position, a transferring position, and a terminating position;
wherein the moveable shuttle moves to the terminating position in response to the first signal received from the first inlet before the second signal is received from the second inlet, and the moveable shuttle moves to the transferring position in response to the second signal being received from the second inlet before the first signal is received from the first inlet.

11. The pyrotechnic transfer arrangement of claim 10, wherein the first inlet is in fluid communication with the outlet in response to the moveable shuttle moving to the transferring position.

12. The pyrotechnic transfer arrangement of claim 11, wherein
the moveable shuttle prevents fluid communication between the outlet and at least one of the first inlet and the second inlet in response to the moveable shuttle moving to the terminating position, and
the first inlet is in fluid communication with the outlet in response to the moveable shuttle being in the transferring position.

13. The pyrotechnic transfer arrangement of claim 12, wherein at least one of the first signal and the second signal comprises a pressure capable of moving the moveable shuttle.

14. The pyrotechnic transfer arrangement of claim 13, wherein at least one of the first signal and the second signal comprises a pyrotechnic transmission signal.

15. The pyrotechnic transfer arrangement of claim 14, wherein the first signal is generated by the first energetic and the third energetic is configured to ignite in response to the first signal being received by the third energetic.

16. The pyrotechnic transfer arrangement of claim 15, wherein the second signal is generated by the second energetic and the moveable shuttle is configured to prevent the third energetic from igniting in response to the second signal being received before the first signal.

17. The pyrotechnic transfer arrangement of claim 15, wherein at least one of the first energetic, the second energetic, and the third energetic comprises a pyrotechnic transmission line.

* * * * *